United States Patent [19]

Voorman

[11] Patent Number: 4,798,982
[45] Date of Patent: Jan. 17, 1989

[54] ACTIVE SYMMETRICAL BALANCE HYBRID CIRCUIT

[75] Inventor: Johannes O. Voorman, Eindhoven, Netherlands

[73] Assignee: U.S. Philips Corporation, New York, N.Y.

[21] Appl. No.: 94,226

[22] Filed: Sep. 8, 1987

[30] Foreign Application Priority Data

Sep. 15, 1986 [NL] Netherlands ............. 8602325

[51] Int. Cl.$^4$ .................................... H03K 5/08
[52] U.S. Cl. ........................... 307/490; 307/491; 333/17 M; 333/32; 379/402; 379/417
[58] Field of Search .............. 307/490, 491, 443, 572; 333/12, 17 M, 32, 177; 379/402, 405, 413, 417

[56] References Cited

U.S. PATENT DOCUMENTS

| | | | |
|---|---|---|---|
| 4,203,012 | 5/1980 | Boxall | 379/405 |
| 4,272,656 | 6/1981 | Nishikawa | 379/405 |
| 4,292,478 | 9/1981 | Davis et al. | 379/405 |
| 4,431,874 | 2/1984 | Zobel et al. | 379/405 |
| 4,540,852 | 9/1985 | Albovy et al. | 379/405 |

*Primary Examiner*—John Zazworsky
*Attorney, Agent, or Firm*—Steven R. Biren

[57] ABSTRACT

The invention relates to an active symmetrical balance hybrid circuit. The hybrid circuit includes an input, an output and an in/output as well an impedance circuit per half section connected to the input and output which is connected between the in/output and one or more virtual ground points. Between a virtual ground point and one of the supply lines a signal transistor is inserted. The hybrid circuit further includes per half section two auxiliary transistors connected between the supply lines and the in/output. The auxiliary transistors multiply by the same factor the current flowing through a signal transistor together with which the auxiliary transistor is incorporated in a current mirror circuit. A signal transistor can be incorporated in a current mirror circuit with one or two auxiliary transistors in the same half section, but also by means of a universal coupling of the two half sections both with an auxiliary transistor in the one and an auxiliary transistor in the other half section. The overall impedance of the impedance circuit is related to the coefficient of the auxiliary transistors to such an extent that the hybrid circuit fulfills the line matching condition. The partial impedances divided between the in/output, output and input are selected such that the balance condition of the hybrid circuit is fulfilled. The use of complementary signal and auxiliary transistors is preferred in the hybrid circuit. The hybrid circuit has a minimum dissipation and requires very little supply voltage, especially when complementary transistors are used.

6 Claims, 3 Drawing Sheets

ACTIVE SYMMETRICAL BALANCE HYBRID CIRCUIT

BACKGROUND OF THE INVENTION

The invention relates to a hybrid circuit comprising an input, an output and an in/output, at least one signal transistor, at least one auxiliary transistor incorporated as a current multiplier in a circuit with an associated signal transistor and an impedance circuit incorporated in a circuit with associated signal transistor, a junction point of this impedance circuit being connected to the output of the hybrid circuit, the impedance circuit as a whole having such an impedance related to the coefficient of the auxiliary transistor that the hybrid circuit fulfills the line matching condition.

A hybrid circuit of the type mentioned hereinbefore is known from the German "Auslegeschrift" No. 2 829 392.

The active hybrid circuit known from the above-mentioned publication can be designed to be symmetrical, having two axially symmetrical half sections. This known active hybrid circuit can further be designed to comprise only NPN-transistors in the signal path, as a result of which in accordance with the then state of the art higher limit frequencies could be obtained than if PNP-transistors would have been inserted in the signal path.

If the known hybrid circuit is of a symmetrical configuration, each half section comprises two signal transistors, one connected to the input and in/output of the hybrid circuit and a negative supply line and being inserted in a circuit comprising an auxiliary transistor switched as a current multiplier, the auxiliary transistor coefficient being smaller than 1, the other signal transistor being connected between the output and in/output of the hybrid circuit and a positive supply line and being incorporated in a circuit comprising an impedance circuit, in the simplest case composed of a series arrangement of two resistors, with more specifically a first resistor being inserted between the collector of the aforesaid signal transistor, and the positive supply line and having a value amounting to half the line resistance, for example 300 Ohms, and the other resistor being connected between the collector and the base of this signal transistor and having a value equal to the inverse decreased by 1 of the aforesaid coefficient times half the line resistance, in order to meet the requirement of line matching. However, to avoid cross-talk of the input signal at the output of the hybrid circuit the aforesaid resistors of the impedance circuit are not interlinked directly, but by means of a base emitter transistor of an additional transistor of the impedance circuit, whose collector is connected to the positive supply line.

The object aimed at with the known hybrid circuit is transmitting onto the line the whole signal current at the input of the hybrid circuit, this object being achieved through the measures of current amplification (division) and impedance transformation, at least as regards transmitting onto the line. Further advantages of the known hybrid circuit are that it is readily integrated relatively simple to construct and that it has a small current consumption.

In addition to the advantage of high limit frequencies, the aforementioned advantages are of importance when such a hybrid circuit has to be inserted in an integrated modem circuit for example, for a viewdata system.

For such use, however, not only should the current consumption or the dissipation be as low as possible, but especially for direct supply from the line the required supply voltage should be as low as possible, with for example a total available power of approximately 20 mW and a total available supply voltage of approximately 4.5-8 V.

Unfortunately, with the known hybrid circuit, specially in practical embodiments thereof, this is not possible owing to the required transistors connected in series and in a totem pole configuration between the supply lines, each requiring a diode voltage (base/emitter voltage) of approximately 0.7 Volt.

SUMMARY OF THE INVENTION

The object of the invention is to provide a new concept for a hybrid circuit in which the least possible supply voltage is lost on required diode voltages.

The invention provides a hybrid circuit of the type mentioned above, characterized in that the impedance circuit is connected between the in/output and at least one virtual ground point of the hybrid circuit and has a further junction point connected to the input of the hybrid circuit, in that the signal transistor(s) is(are) connected between an associated virtual ground point and an associated supply line and in that two auxiliary transistors having the same multiplication coefficient are connected between a respective supply line and the in/output of the hybrid circuit and are incorporated in a current mirror circuit having at least one signal transistor, with junction points in the impedance circuit determining partial impedances being selected such that the hybrid balance condition is fulfilled.

Worded differently, the invention provides an active symmetrical balance hybrid circuit, which need not necessarily be axially symmetrical, but which can also have a universal coupling and which comprises in each half section an in/output for connection to a two-way transmission line, an input for connection to a transmitter and an output for connection to a receiver, an impedance circuit connected between the in/output of the hybrid circuit and preferably one virtual ground point, for example a resistor circuit, whose respective branches are connected to the input and the output of the hybrid circuit, preferably one signal transistor connected between the virtual ground point and a respective supply line and two auxiliary transistors each connected between the in/output of the hybrid circuit and a respective supply line as a current amplifier having a multiplication coefficient larger than 1 and inserted in a current mirror circuit preferably comprising the one signal transistor of the relevant half section, the auxiliary transistors in the latter case being complementary, the resistor circuit being dimensioned such that both the condition of line matching and the condition of hybrid balance are fulfilled, implying that the overall impedance of the resistor-circuit, that is to say on the one side the resistance value of a series arrangement of resistors between the in/output of the hybrid circuit and the virtual ground point and on the other side the coefficient of the auxiliary transistors and the line impedance, more specifically, the line resistance of the transmission line to be connected to the in/output of the hybrid circuit are assimilated such that the in/output resistance of the hybrid circuit as seen from the transmission line is equal to the line resistance, worded more generally, that the impedance of the in/output of the hybrid circuit is the complex conjugate of the line impedance and that the partial resistance-values of the resistor circuit between in/output, output input and the virtual ground point of the hybrid circuit are determined such that a signal on the input of the hybrid circuit does not appear on the output of the hybrid circuit.

As stated hereinbefore, in a preferred embodiment of the hybrid circuit in accordance with the invention, the auxiliary transistors are complementary, implying PNP transistors to be present in the signal path, whose limit frequency can come close to that of NPN transistors in accordance with the present state of the art, whereas, which is more important, in that case the least supply voltage is required because with a drive to full voltage swing both auxiliary transistors in the half sections can assume a negligibly small collector-emitter voltage.

In a further preferred embodiment only NPN-transistors are used in the signal path and the coupling of the half sections is axially symmetrical like in the known hybrid circuit. Per half section, however, exactly one signal transistor is used, this single signal transistor being incorporated in a current mirror circuit with both auxiliary transistors of the same section.

As the resistance value of the resistor between the in/output and output of the hybrid circuit is proportional to the coefficient of the auxiliary transistors, this resistor is preferably designed to be an external resistor among others to fulfill the condition that the resistance value on the in/output of the hybrid circuit may have a maximum tolerance of for example 5%.

In addition to the advantages of low dissipation by simply designing the matching resistor as a virtual resistor, high cut-off frequencies and simplicity of the circuit, further advantageous features of the suggested hybrid circuit are that the circuit is designed to be balanced and to be driven in class A, making the overall current consumption time-invariant and avoiding crosstalk via the supply lines and that the hybrid circuit is extremely linear. The supply voltage and supply current can also be used rather well by piling the bipolar hybrid circuit with one or more layers of I$^2$L. The maximum supply current of 2–4 mA (V·23) can be set or limited by an external resistor.

BRIEF DESCRIPTION OF THE DRAWING

The invention will now be further explained by way of example with reference to the attached drawing, wherein.

DESCRIPTION OF THE PREFERRED EMBODIMENTS

Figure 1:
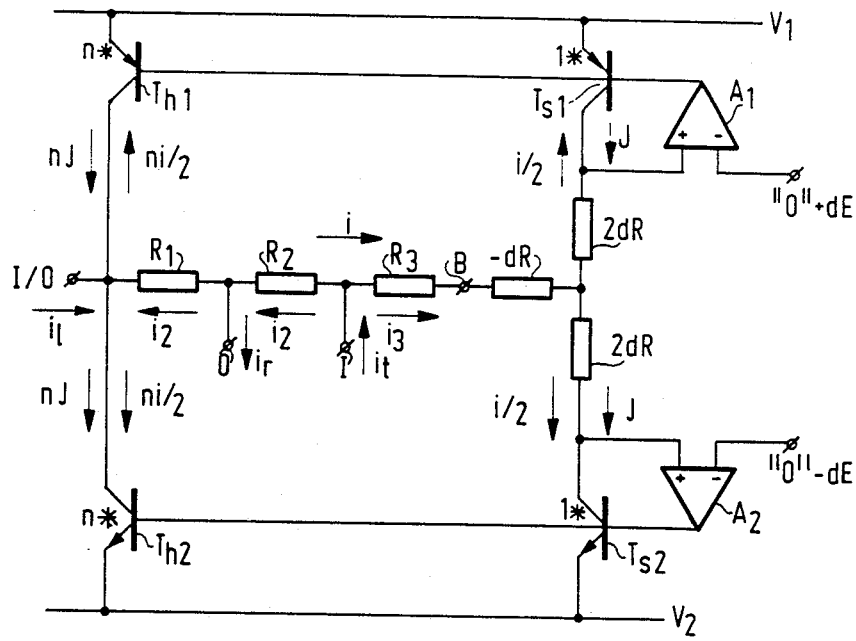
FIG. 1 shows the circuit diagram of an embodiment of the hybrid circuit for explaining the principles of the invention.

In FIG. 1 a half section of an axial symmetrical hybrid circuit in accordance with the present invention is shown. The half section comprises two complementary signal transistors $T_{s1}$, $T_{s2}$ and two complementary auxiliary transistors $T_{h1}$, $T_{h2}$, the bases of the PNP-transistors $T_{s1}$ and $T_{h1}$ being jointly connected to the output of an operational amplifier A1, the emitters of these transistors being connected to a positive supply line $V_1$. The bases of the NPN-transistors $T_{s2}$ and $T_{h2}$ are similarly jointly connected to the output of an operational amplifier A2, their emitters being connected to a negative supply line $V_2$.

The collectors of the auxiliary transistors $T_{h1}$, $T_{h2}$ are jointly connected to the in/output I/O of this half section of the hybrid circuit, which can be connected to the in/output of the other section by means of a winding of a line transformer (not shown) while the other winding of the line transformer can be connected to a transmission line.

The collector of the signal transistor $T_{s1}$ is connected to the non-inverting input of the operational amplifier A1, the inverting input of the operational amplifier A1 having a slight positive DC bias +dE and this inverting input being grounded for signals, while the collector of the signal transistor $T_{s2}$ is connected to the non-inverting input of the operational amplifier A2, the inverting input of the operational amplifier A2 having a slight negative DC bias −dE and this inverting input being grounded for signals, which is indicated in the figure by respectively "0"+dE and "0"−dE. As a result of the functioning of operational amplifiers A1, A2 the collectors of the signal transistors $T_{s1}$, $T_{s2}$ are virtually grounded, that is the voltage is at ground level, but the current cannot flow to ground.

Worded differently, the signal transistors $T_{s1}$ and $T_{s2}$ are virtually switched as diodes and form current mirror circuits with the associated auxiliary transistors $T_{h1}$ and $T_{h2}$, causing the collector currents of the signal transistors $T_{s1}$ and $T_{s2}$ to be identical. The auxiliary transistors $T_{h1}$ and $T_{h2}$ are switched as current amplifiers, for example as a result of the presence of an emitter resistor (not shown) in the emitter lines of the auxiliary transistors $T_{h1}$ and $T_{h2}$, this resistor being n times smaller than the emitter resistors (not shown) in the emitter lines of the signal transistors $T_{s1}$ and $T_{s2}$, causing the current coefficient to be n, which in the figure is indicated by $1^x$ and $n^x$ with the respective signal transistors $T_{s1}$, $T_{s2}$ and the auxiliary transistors $T_{h1}$, $T_{h2}$. In practice this can be done more accurately by providing correspondingly different emitter surfaces for the integrated signal transistors $T_{s1}$, $T_{s2}$ as the only measure, or in combination with the aforesaid measure.

Between the junction point of the in/output I/O of the half hybrid circuit section and the collectors of the auxiliary transistors $T_{h1}$, $T_{h2}$ and the associated junction points of the collector of the signal transistor $T_{s1}$ and the non-inverting input of the operational amplifier A1 on the one side and of the collector of the signal transistor $T_{s2}$ and the non-inverting input of the operational amplifier A2 on the other, an impedance circuit is inserted comprising in the shown embodiment a resistor circuit $R_1$, $R_2$ and $R_3$ as well as a T-section of three small resistors with two small resistors 2dR being inserted in the parallel branch and one small resistor −dR being inserted in the series branch and the unused end of the latter small resistor being connected to the resistor circuit, more specifically $R_3$, the unused ends of the small resistors 2dR being connected to respective junction points of signal transistors $T_{s1}$, $T_{s2}$ and the non-inverting inputs of respective operational amplifiers A1, A2. The junction point of resistor −dR and resistor $R_3$ is indicated by B, the input I of the half hybrid circuit being connected to the junction point of resistor $R_2$ and $R_3$ and its output O being connected to the junction point of resistors $R_1$ and $R_2$. For practical reasons preference is given to having $R_3-dR>0$.

In a state of equilibrium a small direct voltage $+dE$ will be applied to the collector of signal transistor $T_{s1}$ due to the operation of operational amplifier A1. Similarly a small direct voltage $-dE$ will be applied to the collector of signal transistor $T_{s1}$. Consequently, a quiescent current $J=2dE/4dR$ will flow from the collector of signal transistor $T_{s2}$, and as a result of the coefficient n of the auxiliary transistors $T_{h1}$, $T_{h2}$ a quiescent current nJ will flow from the collector of the auxiliary transistor $T_{h1}$ to the collector of the auxiliary transistor $T_{h2}$.

In $n>>1$ the largest current consumption will take place in the auxiliary transistors $T_{h1}$, $T_{h2}$. Assuming a signal current $i_l$ flowing into the in/output I/O, a current flowing into auxiliary transistor $T_{h1}$ will be approximately $nJ-i_l/2$, while the current flowing into auxiliary transistor $T_{h2}$ will be $nJ+i_1/2$.

Because it was assumed for the half hybrid circuit section shown in FIG. 1 that the line current $i_l$ flowed into the in/output I/O, this current $i_l$ will flow from the in/output of the other half section, so that for this other half section the condition holds that for the auxiliary transistor in the other half section corresponding to auxiliary transistor $T_{h1}$ the current flowing through this auxiliary transistor will be $nJ+i_l/2$, and will be analogously $nJ-i_l/2$ through the auxiliary transistor in the other half section corresponding to the auxiliary transistor $T_{h2}$.

Consequently, the overall current consumption of the whole hybrid circuit will be $2(n+1)J$, irrespective of the signal current $i_l$. In view of the fact that the supply lines in an integrated circuit can cause considerable resistance, a time-invariant current dissipation will avoid circuit cross-talk to further circuits fed by the same supply lines in the entire hybrid.

The transistors $T_{h1}$ and $T_{h2}$ cannot handle negative current. So the supply current of these transistors nJ has to be larger than the peak value of $ni/2$. For a large n the condition holds that ni is about equal to the line current $i_l$. The line current $i_l$ consists of a part $i_{lt}$ coming from a transmitter and a part $i_{lr}$ intended for a receiver. The following condition should hold: $2nJ>$peak value of $(i_{lt}+i_{lr})$. The supply voltage between the supply lines $V_1$ and $V_2$ should further be larger than twice the peak value of the line voltage $v_1$. If the said supply voltage is E, the following condition should hold:

$$E>\text{peak value of }(v_{lr}-v_{lt})$$

In the worst case with an overall maximum signal level on a transmission line of 600 Ohms in accordance with the V-23 standard of 1 milliwatt there is a transmitter power of 0.5 milliwatt and a receiver power of 0.5 milliwatt, so that the peak value of $i_{lt}+i_{lr}$ is the root of 20/3 milliampere and the peak value of $V_{lt}-v_{lt}$ is the square root of 2.4 Volts, leading to the theoretical minimum power consumption for the entire hybrid circuit of:

(voltage difference between supply lines $V_1$, $V_2$) $\times$ $$2nJ = \sqrt{2.4} \times \sqrt{20} /3 \text{ milliwatts} = 4 \text{ milliwatts.}$$

Hereinbelow the line matching condition for the embodiment of the hybrid circuit in accordance with FIG. 1 will be calculated.

Let it be assumed that $i_t=i_r=0$, a signal current $i_l$ flowing into in/output I/O of the half section shown in FIG. 1 will result in a current i in the resistor circuit $R_1$, $R_2$, $R_3$, branching into currents i/2 through signal transistors $T_{s1}$, $T_{s2}$, causing currents ni/2 to flow into auxiliary transistors $T_{h1}$, $T_{h2}$. Applying the appropriate Kirchoff's law to the in/output I/O will yield $i_l=ni/2+ni/2+i=(n+1)i$. As the collectors of the signal transistors $T_{s1}$, $T_{s2}$ are virtually grounded, the resistors 2dR are connected in parallel with each other and this parallel circuit is connected in series with the resistor $-dR$, resulting in 0 Ohm net. Let the resistance value of the series arrangement of resistors $R_1+R_2+R_3=R_{tot}$, let $V_1$ be the signal voltage on the in/output I/O, and let the connection to the line transformer of the in/output I/O be translated into a virtually grounded half line resistance $R_l/2$; then the following condition will hold:

$$Y_1=iR_{tot}=R_l/2 \cdot i_l=R_l/2(n+1)i,$$

from which it follows that:

$$R_{tot}=(n+1)R_l/2 \text{ (line matching condition).}$$

As a result of a virtual impedance in the place of the balance in the hybrid circuit in accordance with the invention forming a correct terminating impedance because of feedback, an electronic measure is taken to minimize dissipation loss in the balance on transmitting.

Subsequently, the hybrid balance condition will be calculated, assuming for convenience that a signal current $i_t$ in the input I results in a signal voltage O at the output O, the signal current $i_t$ in the input I branching into partial signal currents $i_2$ and $i_3$ because of the resistors $R_2$ and $R_3$, as represented in FIG. 1, with the following conditions holding for these partial signal currents:

$$i_2 = \frac{R_3 \cdot i_t}{R_2 + R_3} \; ; \; i_3 = \frac{R_2 \cdot i_t}{R_2 + R_3}$$

It is likewise assumed that the in/output I/O is virtually grounded via the half line resistor $R_l/2$. As it is assumed that the transmit current $i_t$ in the input I results in a signal current $i_r$ from the output equalling 0, the total partial signal current $i_2$ will flow through $R_2$ and through $R_1$. This will result in the following equation:

$$i_t \cdot R_l/2 = i_2 \cdot R_1$$

As the partial signal current $i_3$ equally branches over signal transistors $T_{s1}$, $T_{s2}$ through $R_3$, these equally branched partial currents multiplied by the coefficient n will occur in the auxiliary transistors $T_{h1}$, $T_{h2}$, so that the following condition will hold:

$$i_l = ni_3/2 + ni_3/2 - i_2$$

Now the following condition holds:

$$R_l/2 \cdot (ni_3-i_2) = R_1 \cdot i_2$$

or:

$$R_l/2 \cdot \left[ n \cdot \frac{R_2 \cdot i_t}{R_2+R_3} - \frac{R_3 \cdot i_t}{R_2+R_3} \right] = R_1 \frac{R_3 \cdot i_t}{R_2+R_3}$$

or:

$$(nR_2-R_3)\cdot R_l/2 = R_1\cdot R_3 \text{ (hybrid balance condition)}.$$

If $R_2=R_3$ it will follow that:

$$(n-1)\cdot R_l/2 = R_1.$$

If, in addition, $R_2=R_3=R_l/2$ the line matching condition is fulfilled at the same time.

If we take $R_2=R_3=R_l/2=300$ Ohms as a numerical example, it will hold that $R_1=(n-1)\cdot 300$ ohms. If, for example, we take 12 for n, $R_1$ will be 3.3 kilohms. As observed before this resistor $R_1$ can be designed to be an external resistor.

Owing to the use of complementary auxiliary transistors $T_{h1}$, $T_{h2}$ a design in accordance with FIG. 1 of the hybrid circuit according to the invention will need at least supply voltage, which is the difference in voltages f supply lines $V_1$ and $V_2$, which difference has to exceed the peak value of the signal voltage $v_1$ incremented by two times the saturation voltage of the collector-emitter path of the auxiliary transistors $T_{h1}$, $T_{h2}$, which saturation voltage can amount to approximately 100 millivolts.

A more practical embodiment of the hybrid circuit with complementary transistors in accordance with the present invention based on the circuit of FIG. 1 will now be further described with reference to FIG. 2.

Figure 2:
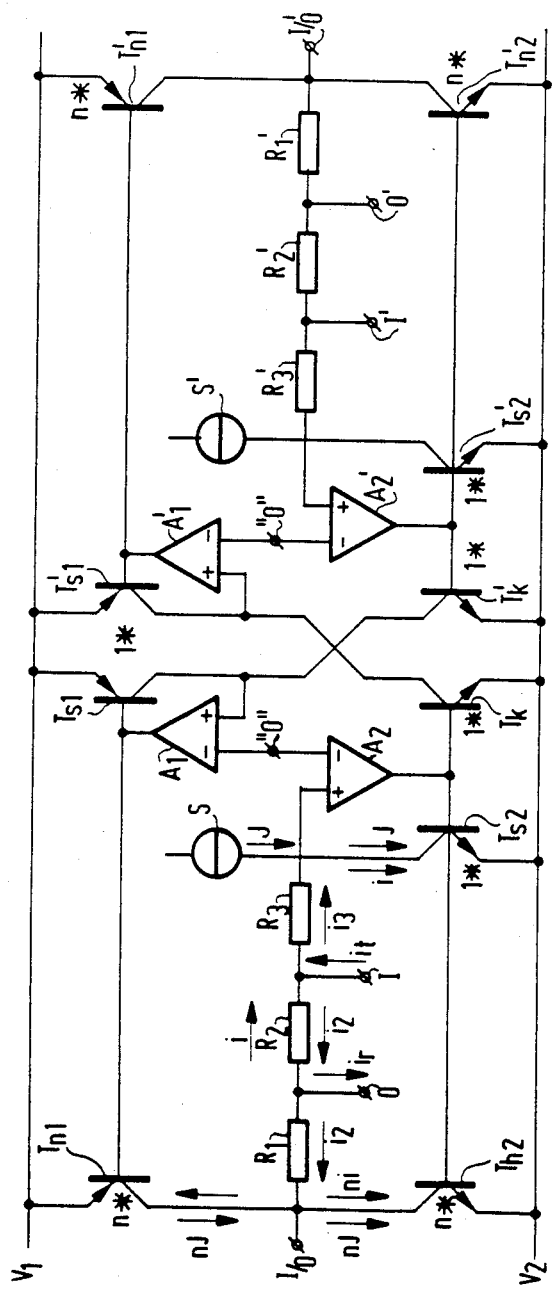
FIG. 2 shows a preferred embodiment of a total hybrid circuit in accordance with the present invention based on the example of FIG. 1.

In FIG. 2 is shown a complete hybrid circuit to clearly show that the half sections are not axially symmetrical but form a universal coupling. Elements corresponding with those in FIG. 1 are indicated by the same reference characters. By providing a direct current source S in each half section the resistors $-dR$ and $2dR$ in FIG. 1 can be omitted and there will be no need of the small direct voltages $+dE$ and $-dE$ at the inverting inputs of the operational amplifiers A1 and A2. Corresponding elements in the upper half section have identical reference characters but are distinguished by an accent. Respective coupling-transistors $T_k$ and $T'_k$ have been extended to the half sections of the complete hybrid circuit in FIG. 2.

The half section of the hybrid circuit shown in FIG. 2 corresponding to the half section shown in FIG. 1 will henceforth be called the left section, the other half obviously being called the right section.

Let it be assumed that $i_t=i_r=0$; a signal current $i_1$ into the in/output I/O of the left section will then result in a current i through the resistor circuit $R_1$, $R_2$, $R_3$ to the junction point with the current source S, supplying a current J, to the collector of signal transistor $T_{s2}$ and the non-inverting input of the operational amplifier A2, whose output is connected to the base of signal transistor $T_{s2}$ and whose inverting input is connected to a reference voltage (ground point) to which the inverting input of operational amplifier A1 is also connected, whose non-inverting input is connected to the collector of signal transistor $T_{s1}$ and whose output is connected to the base of signal transistor $T_{s1}$. By means of the operational amplifiers A1, A2 connected thus, the signal transistors $T_{s1}$, $T_{s2}$ are virtually switched as diodes. The base of signal transistor $T_{s2}$ is connected to the base of auxiliary transistor $T_{h2}$ and likewise to the base of coupling transistor $T_k$. Due to this current mirror circuit the collector currents of the signal transistor $T_{s2}$, auxiliary transistor $T_{h2}$ and coupling transistor $T_k$ are interrelated in a ratio of 1:n:1. In a like manner the collector currents of signal transistor $T'_{s2}$ auxiliary transistor $T'_{h2}$ and coupling transistor $T'_k$ of the right section are also interrelated in a ratio of 1:n:1. The collector current of signal transistor $T_{s1}$ of the left section is further equal to the collector current of coupling transistor $T'_k$, due to the universal coupling with coupling transistor $T'_k$ of the right section as the operational amplifier A1 substantially draws no current. The signal transistor $T_{s1}$ being virtually connected as a diode and its base being connected to the auxiliary transistor $T_{h1}$, a current mirror circuit will be formed, causing the collector current of the auxiliary transistor $+T_{h1}$ to be n times the collector current of signal transistor $T_{s1}$. The circuit formed by the auxiliary transistor $T_{h1}$ and signal transistor $T_{s1}$ in the left section and the coupling transistor $T'_k$ the signal transistor $T'_{s2}$ and the auxiliary transistor $T'_{h2}$ in the right section can therefore be called a current mirror circuit. The same applies to the signal transistor $T_{s2}$, auxiliary transistor $T_{h2}$ and coupling transistor $T_k$ of the left section and the signal transistor $T'_{s1}$ and auxiliary transistor $T'_{h1}$ in the right section.

The hybrid circuit of FIG. 2 can possibly be designed to be complementary, that is to say that PNP-transistors are replaced by NPN-transistors and vice versa.

Analogous to FIG. 1, the line matching condition can be calculated as follows:

$$R_{tot}=R_1+R_2+R_3=(2n+1)\cdot R_l/2$$

and the hydrid balance condition:

$$R_l/2\cdot(2nR_2-R_3)=R_1R_3.$$

Letting $R_2$ and $R_3$ be equal, the two conditions are fulfilled if:

$$R_1=(2n-1)\cdot R_1/2 \text{ and } R_2=R_3=R_l/2$$

Figure 3:
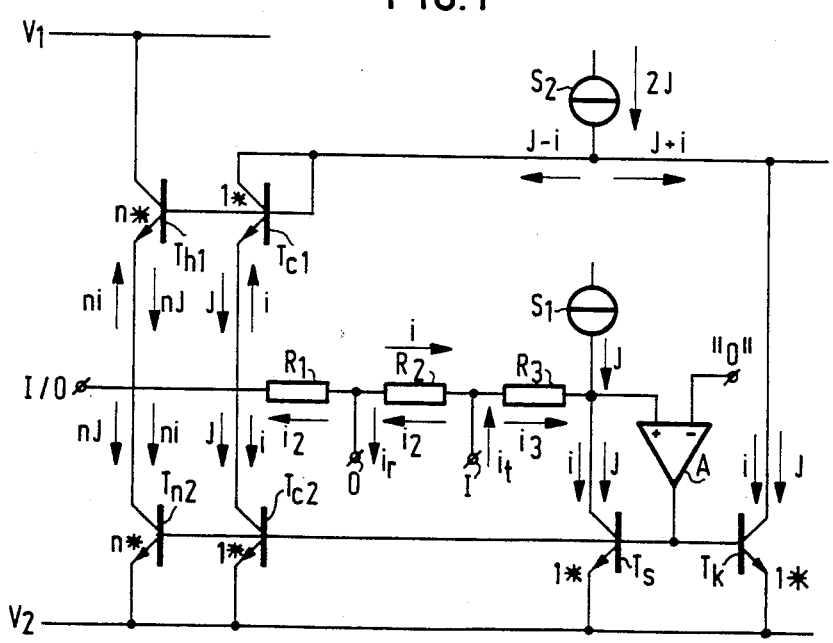
FIG. 3 shows a half section of a further preferred hybrid circuit.

A preferred embodiment of an axially symmetrical hybrid circuit will now be described with reference to FIG. 3 showing a half section only using NPN-transistors in the signal paths and with a possibly higher limit frequency having a detrimental effect on the supply voltage requiring a supply voltage which is one base-emitter voltage higher. Elements in FIG. 3 corresponding to those in FIG. 1 are again indicated by identical reference characters. In the half section of FIG. 3 there is a single signal transistor $T_s$ whose collector is virtually grounded through the operational amplifier A having its inverting input connected to a reference voltage (ground), the signal transistor $T_s$ being virtually switched as a diode by connecting the non-inverting input of the operational amplifier A to its collector and by connecting the output of the operational amplifier A to its base. The signal transistor $T_s$ together with auxiliary transistor $T_{h2}$ forms a current mirror circuit causing the collector current of the auxiliary transistor $T_{h2}$ to be n times the collector current of the signal transistor $T_s$. The signal transistor $T_s$ not only forms a current mirror circuit with auxiliary transistor $T_{h2}$, but with coupling transistor $T_k$ as well. The collector current of coupling transistor $T_k$ is equal to the collector current of the signal transistor $T_s$. The respective transistors $T_{c1}$ and $T_{c2}$ are connected in parallel with the auxiliary transistors $T_{h1}$ and $T_{h2}$, transistor $T_{c1}$ being connected as a diode. The collector of coupling transistor $T_k$ is connected to the collector of transistor $T_{c1}$, a direct current source $S_2$ being connected to the junction point of the collectors and supplying a current 2J. A current source S₁ supplying a current J is connected to the junction point of the resistor circuit $R_1$, $R_2$, $R_3$, the collector of the signal transistor $T_s$ and the non-inverting input of the operational amplifier A.

Let it be assumed that a line signal current $i_l$, supplied to the in/output I/O of the half hybrid circuit of FIG. 3 results in a current i through the resistor circuit $R_1$, $R_2$, $R_3$ and that $i_r=i_t=0$, the current i will than flow through the signal transistor $T_s$ and also through the coupling transistor $T_k$ and the transistor $T_{c2}$ tneand the current ni will flow through the auxiliary transistor $T_{h2}$. The current i through the coupling transistor $T_k$ will entail a current i through the transistor $T_{c1}$ and this current will result in a current ni through the auxiliary transistor $T_{h1}$. In other words auxiliary transistors $T_{h1}$ and $T_{h2}$ are connected to the signal transistor $T_s$ in a current mirror circuit.

Analogous to the aforedescribed embodiments the following condition holds for line matching:

$$R_{tot}=(2n+3)\cdot R_l/2$$

As regards the hybrid balance condition the following holds:

$$((2n+2)R_2-R_3)\cdot R_l/2=R_1\cdot R_3.$$

If again it is assumed that $R_2=R_3$ these two conditions are fulfilled if:

$$R_1=(2n+1)\cdot R/2 \text{ and } R_2=R_3=R/2.$$

Although hereinbefore a 1:1 line output transformer ratio was assumed, with a different line output transformer ratio the maximum line signal voltage can be accommodated to the supply voltage. By implementing this measure the other transformer ratio can act as a parameter in the line matching and hybrid balance condition. At a ratio of 1:m the following condition will hold for FIG. 3:

$$R_1=m^2(2n+1)\cdot R_l/2 \text{ and } R_2=R_3=m^2R_l/2.$$

In FIG. 3 the current source S₂ forces transistor $T_{c1}$ to supply a current which is complementary to the current through coupling transistor $T_k$ and therefore the current through signal transistor $T_s$.

Also in FIG. 3 the current coefficient n provides a virtual input resistance of for example 300 ohms on the in/output I/O.

In FIG. 3 a transmitter current $i_t$ in the input I with $i_r=0$ results in a line current $i_l$ in the in/output I/O which equals:

$$i_1 = (2ni_3 + 2i_3) - i_2 = (2n+2)\cdot \frac{R_2 \cdot i_t}{R_2+R_3} - \frac{R_3 \cdot i_t}{R_2+R_3}$$

and if $R_2=R_3$ the condition holds that:

$$i_l=(n+0.5)\cdot i_t.$$

The signal voltage $v_r$ scanned by a receiver on the output O equals:

$$v_r = \frac{R_2+R_3}{R_1+R_2+R_3}\cdot V_1$$

With $R_1=(2n+1)-R_l/2$ and $R_2=R_3=R_l/2$ the following condition holds:

$$v_r = \frac{V_1}{n+1,5}.$$

In the embodiments of the integratable symmetrical balance hybrid circuit in accordance with the invention discussed and shown hereinbefore, for clarity's sake it was assumed to use operational amplifiers for virtually grounding collectors of signal transistors and virtually switching these transistors as diodes to result in a current mirror circuit. Such a use of operational amplifiers is not necessary, though, as will be explained hereinafter with reference to FIGS. 4A–C, likewise indicating how a virtual ground point can be simply provided.

Figure 4C:
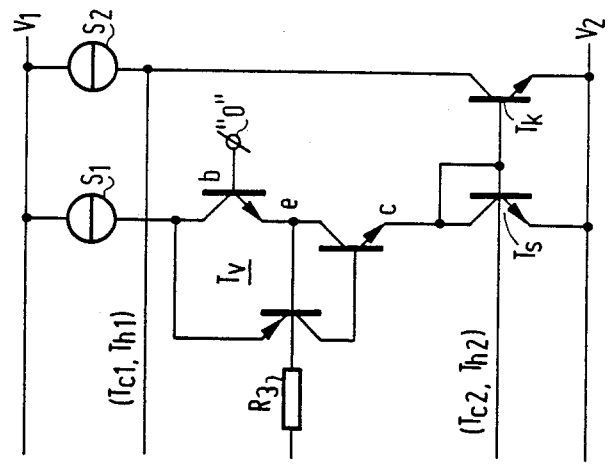
FIGS. 4A–C show examples for realizing a virtual ground point in the case of the hybrid circuit section of FIG. 3.
Figure 4B:
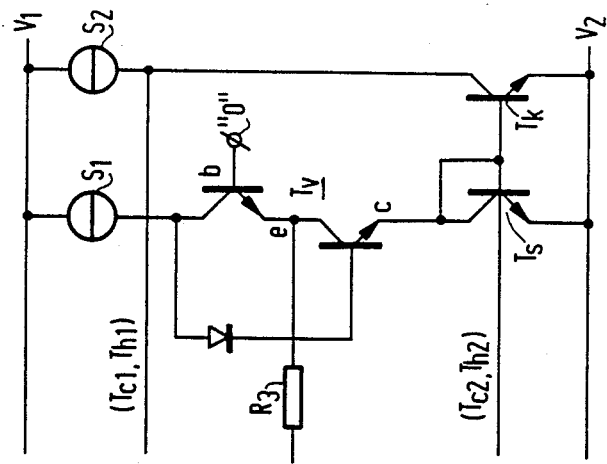
Figure 4A:
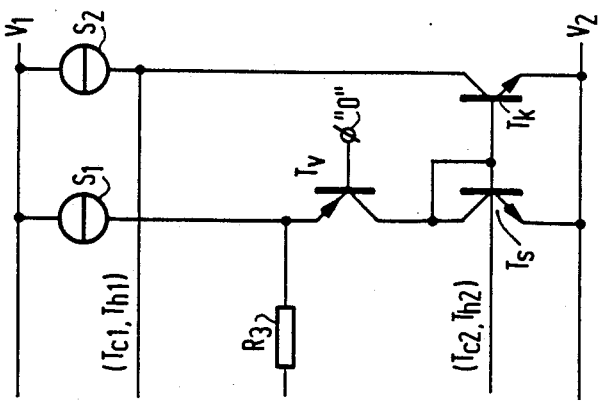

FIGS. 4A–C correspond to FIG. 3 and identical reference characters are used. The differences between FIG. 3 and FIG. 4A are that the signal transistor $T_s$ is switched as a diode and the operational amplifier A is substituted for a PNP-transistor $T_v$, whose base is connected to a reference voltage "O" (ground), its collector being connected to the junction point of the bases of the transistors $T_s$, $T_k$, $T_{c2}$ and $T_{h2}$, and its emitter being connected to the junction point of direct current source S₁ and resistor $R_3$, the collector of $T_s$ not being connected to the latter junction point. A disadvantage of the circuit of FIG. 4A could be that the virtual ground point between resistor $R_3$, direct current source S₁ and the emitter of the PNP-transistor $T_v$ is a virtual ground point only by approximation due to the base emitter voltage of this transistor $T_v$. FIGS. 4B and 4C give solutions to this problem, the PNP-transistor $T_v$ being simulated ($\underline{T}_v$) with the aid of a number of transistors and possibly a diode. FIGS. 4B and 4C show the base-emitter and collector connections b, e, c of the simulated PNP-transistor $\underline{T}_y$.

The operation of the circuits shown in FIGS. 4A–C will be clear for those skilled in the art and a further explanation thereof will not be given, while it should be observed that there are and that there can be designed a great many more of these circuits.

The direct current sources S, S′, S₁ and S₂ as well as direct current sources which are not shown are preferably PNP-transistors.

What is claimed is:

1. A hybrid circuit comprising an input, an output and an in/output, at least one signal transistor, at least two auxiliary transistors for operation as current multiplexers in a circuit with an associated signal transistor and an impedance circuit incorporated in a circuit with an associated signal transistor, a junction point of the impedance circuit being connected to the output of the hybrid circuit, the impedance circuit having such an impedance related to the multiplication coefficient of the auxiliary transistor that the hybrid circuit fulfills a condition known as the line matching condition, characterized in that the impedance circuit is connected between the in/output and at least one virtual ground point of the hybrid circuit and has a further junction point connected to the input of the hybrid circuit, in that each signal transistor is connected between an associated virtual ground point and an associated supply line and in that two auxiliary transistors having the same multiplication coefficients are connected between an associated supply line and the in/output of the hybrid circuit and are incorporated in a current mirror circuit having said at least one signal transistor, with junction points in the impedance circuit determining partial impedances being selected such that a condition known as the hybrid balance condition is fulfilled.

2. A hybrid circuit as claimed in claim 1, comprising a single signal transistor, characterized in that the impedance circuit is connected between the in/output and a single virtual ground point of the hybrid circuit, in that the signal transistor is connected between the virtual ground point and a first supply line and in that the two auxiliary transistors having the same current coefficient through the signal transistor are connected between respectively the first and a second supply line and the in/output of the hybrid circuit and are incorporated in a current mirror circuit comprising the signal transistor.

3. A hybrid circuit as claimed in claim 1, characterized in that the two auxiliary transistors are complementary.

4. A hybrid circuit as claimed in claim 3, comprising a first signal transistor and a second signal transistor complementary to the first, characterized in that the impedance circuit is connected between the in/output and a first and a second virtual ground point of the hybrid circuit, in that the first and second signal transistors are connected between the first and second ground points and a first and a second supply line, respectively, and in that a first and a second auxiliary transistor having the same coefficient and said second auxiliary transistor being complementary to the first are connected between the first and the second supply line and the in/output of the hybrid circuit, respectively, for the current through the first and second signal transistor, respectively, and being incorporated in a current mirror circuit with the respective first and second signal transistors, the first signal transistor and auxiliary transistor being of the same conductivity type.

5. A hybrid circuit as claimed in claim 3, which is of a symmetrical configuration, characterized in that each half section comprises a signal transistor incorporated in a current mirror circuit with one of the auxiliary transistors of this half section, the other auxiliary transistor of this half section being incorporated in a current mirror circuit with the associated signal transistor of the other half section.

6. A hybrid circuit as claimed in claim 5, comprising a first and a second half section, each comprising a single signal transistor, characterized in that in each half section the impedance circuit is connected between the in/output and a virtual ground point of the half section, in that the single signal transistor is connected between the virtual ground point and a first supply line and in that the two auxiliary transistors having the same coefficient for the current through the single signal transistor are connected between the first and a second supply line and the in/output, respectively, of the half section and are incorporated in a current mirror circuit with the single signal transistor, the single signal transistor of the first half section being incorporated in a current mirror circuit comprising a first auxiliary transistor of this half section and the second auxiliary transistor of the second half section, the single signal transistor of the second half section being incorporated in a current mirror circuit comprising a first auxiliary transistor of this half section and the second auxiliary transistor of the first half section.

* * * * *